Aug. 13, 1940.  W. T. NARDIN  2,211,024
MACHINE FOR COOKING HOT DOGS
Filed Aug. 19, 1939  4 Sheets-Sheet 1
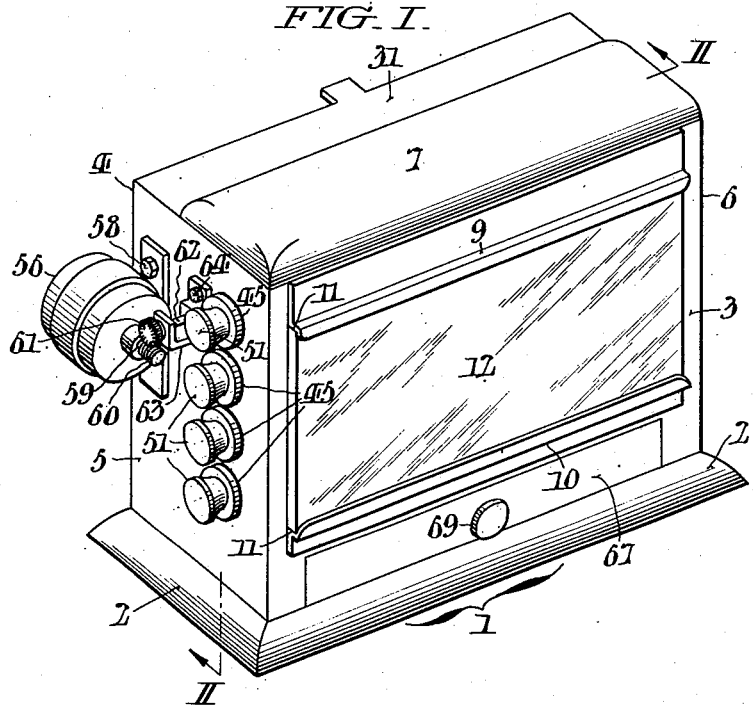
FIG. I.
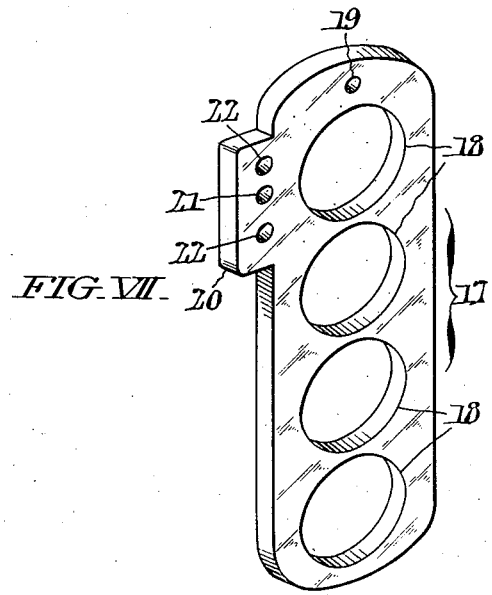
FIG. VII.
WITNESSES:
INVENTOR:
William T. Nardin,
BY
ATTORNEYS.

Aug. 13, 1940.  W. T. NARDIN  2,211,024
MACHINE FOR COOKING HOT DOGS
Filed Aug. 19, 1939  4 Sheets-Sheet 2
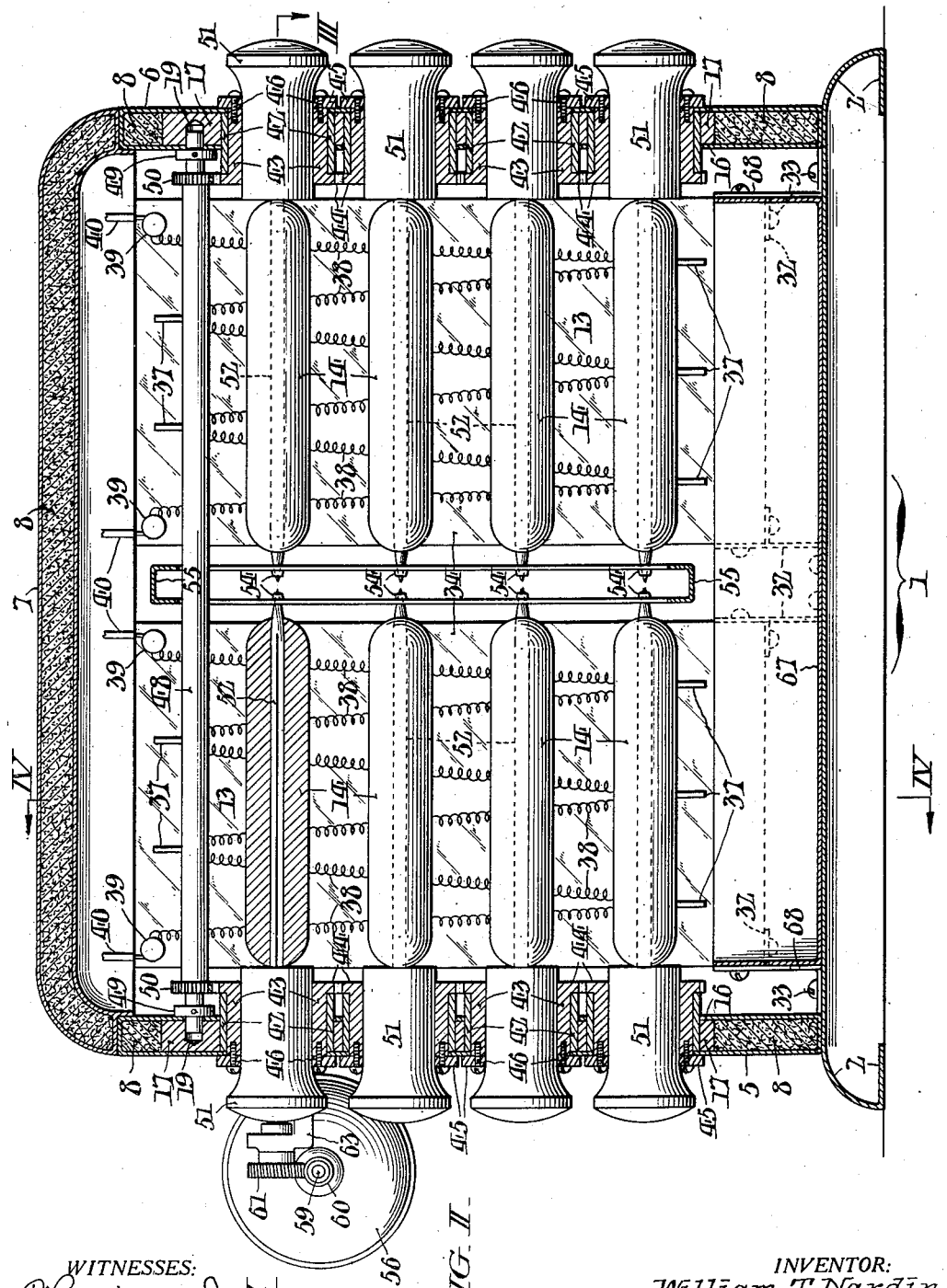
FIG. II.
WITNESSES:
INVENTOR:
William T. Nardin,
BY
ATTORNEYS.

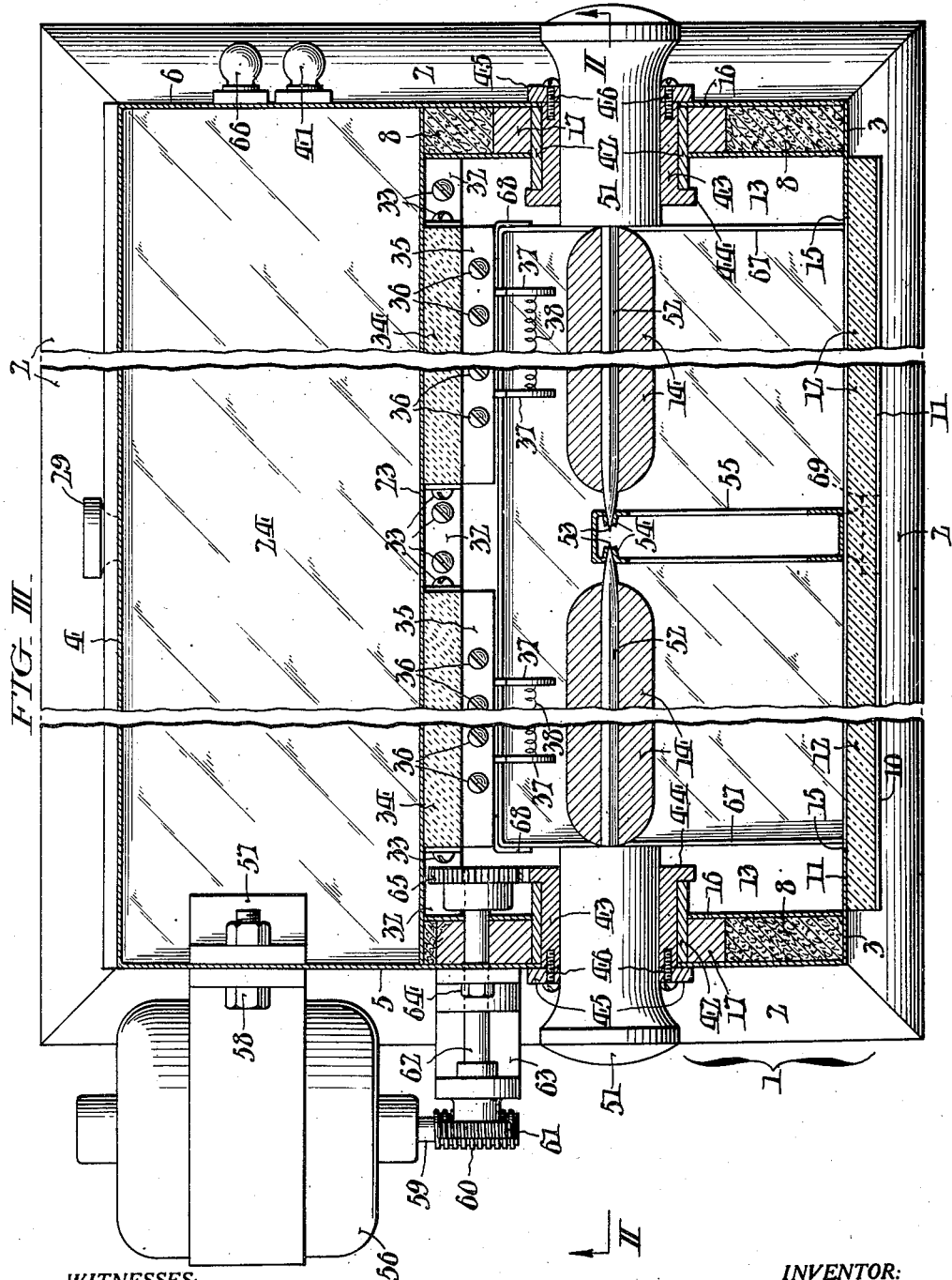

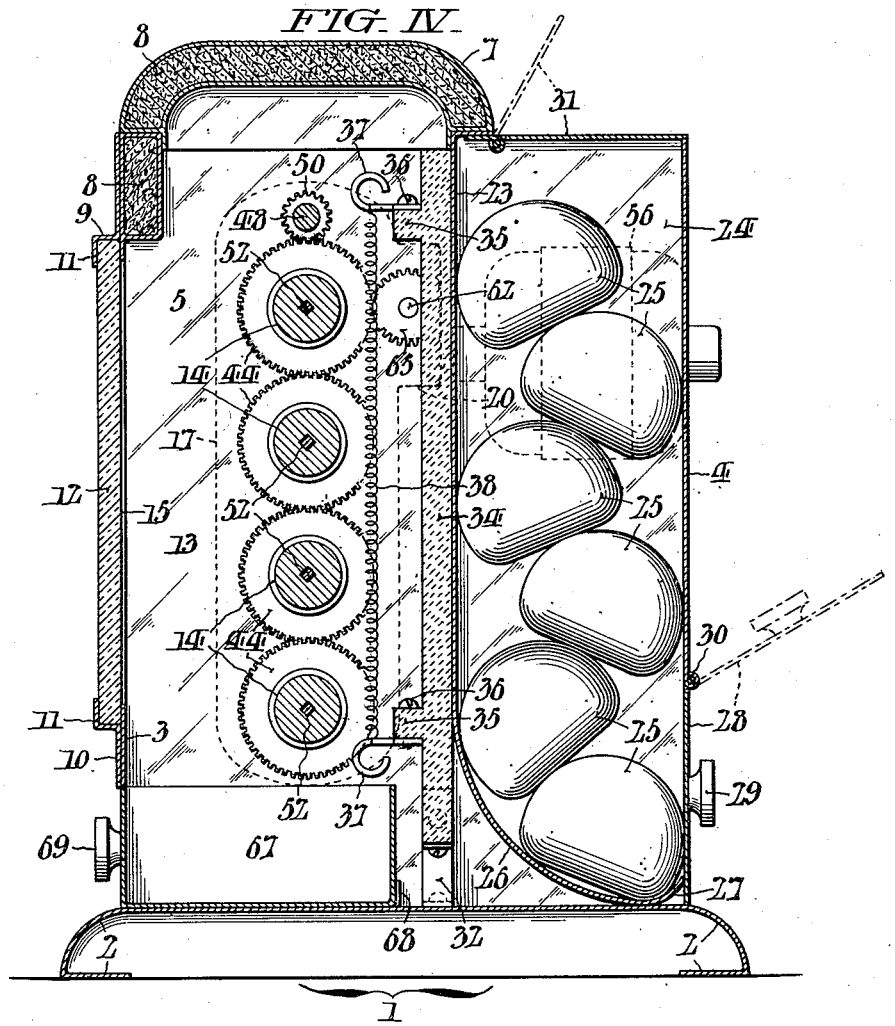
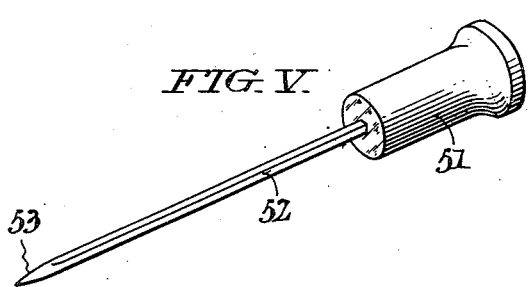
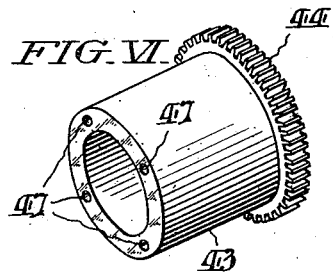

Patented Aug. 13, 1940

2,211,024

UNITED STATES PATENT OFFICE 2,211,024

MACHINE FOR COOKING HOT DOGS

William T. Nardin, Moorestown, N. J.

Application August 19, 1939, Serial No. 290,966

8 Claims. (Cl. 53—5)

This invention relates to means for the mass cooking of comestibles and, more particularly, has reference to machines for roasting flesh foods; while it primarily aims to provide a machine of the above titular designation more particularly devised for barbecuing wieners or "hot dogs."

A secondary aim of the present invention is to provide a machine of the above typified species wherein paralleling banks of "hot dogs" may be serially or collectively barbecued.

A further aim of this invention is to furnish a "hot dog" cooking machine including a separate compartment or receptacle for warming "rolls" for serving with the "hot dogs."

A still further aim is to provide novel means, in a machine of the specified character, whereby the individual wieners or "hot dogs" are independently insertable and removable, and means whereby all of the "skewers" or supporting means for the said wieners or "hot dogs" are operatively coordinated for serial or collective actuation.

Another aim of this invention is to provide an electrically heated machine of the specified character which is simple in construction, efficient in operation, and comparatively cheap to manufacture.

With the above recited objects in view, and ancillary advantages that will appear as this description proceeds, the present invention comprises various novel features of construction and arrangement of parts, such as are set forth with particularity in the following explanation thereof; illustrated by the accompanying sheets of drawings; and more tersely expressed in the concluding claims.

In the drawings:

Fig. I is a perspective view of a wiener or "hot dog" cooking machine embodying one typical form of this invention.

Fig. II is a vertical section on the plane designated II—II in Figs. I and III, but drawn to a larger scale for better illustration of certain structural details.

Fig. III is a plan section of the line III—III in Fig. II.

Fig. IV is a vertical section on the plane IV—IV of Fig. II.

Fig. V is a perspective view of a skewer, later on fully described.

Fig. VI is a perspective view of a sleeve gear hereinafter described; and,

Fig. VII is a detail view of a bearing component incorporated in each of the machine side walls, as later explained.

Referring more in detail to the several views, the improved cooking machine of this invention conveniently comprises an enclosure preferably constructed of suitable sheet metal and comprising a base 1, having a surrounding convexed bead and inwardly-directed supporting flange 2. Surmounting the base 1, and fixedly secured thereto, are spaced front and back walls 3, 4, respectively; as well as complemental side walls 5, 6; and a somewhat inverted dish-like crown or top 7. The side walls 5 and 6, as well as the top 7, are of hollow sheet metal construction packed with suitable thermo-insulating medium 8, while the front and back walls 3, 4 are of preformed sheet-metal.

Snugly fitting upper and lower angled sections 9, 10, respectively, are secured to the front wall 3 and define therewith channel grooves 11 for a removable glass panel 12, affording access to the frontal portion or cooking compartment 13, for cleaning purposes, as well as providing a sight opening for viewing of the wieners or "hot dogs," while cooking, through a registering opening 15 cut-out of the front wall 3, as readily seen in Figs. III and IV.

Appropriately incorporated in each side wall 5 and 6 in a conformatory space 16, free of the medium 8 and intermediate the facing outer and inner sheet metal elements thereof, as best conventionally shown by dotted lines in Fig. IV, is fitted and rigidly secured a bearing block or member 17, Fig. VII, of a configuration to fit the space aforesaid. Each member 17 is provided with vertically spaced apertures 18, a socket 19 alignedly above said apertures and, in addition thereto, a lateral projection 20 having a shaft journal 21 with vertically spaced orifices 22, for purposes hereinafter explained.

Intermediate the front and back walls 3, 4 is a partition 23 extending between, and sealed to, the end walls 5, 6, thereby separating the cooking chamber 13 from an auxiliary chamber or receptacle 24, for reception of rolls 25 to be heated. The partition 23 has the lower part outwardly curved at 26, with the free edge upwardly lipped at 27, to function as a chute for respectively guiding and arresting the warmed rolls 25 against a fall-down or outlet door 28 having a finger grasp 29, and hinged to the back wall 4 at 30, said door being lifted as indicated by dot-and-dash lines at the right hand of Fig. IV for successive removal of rolls 25 as required. At the top the roll receptacle 24 is provided with a hinged cover or lid 31 for filling purposes.

Preferably supported by angle brackets 32 in spaced relation to the base 1, and held in rigid position by securing means 33, are paralleling and coplanar refractory material slabs 34, of a lateral width to accommodate the longitudinal dimension of the wieners or "hot dogs" 14, as best seen from Figs. II and III. These slabs 34 abut the flat portion of the partition 23 for the purpose of conducting heat to the roll receptacle 24, in an obvious manner. Each slab 34 is, preferably, formed with lateral ribs 35 to which are secured, as by fastening means 36, suitable elements 37 for supporting the heater coils 38, said coils having their free ends connected to binder posts 39 with conductor wires 40 in circuit with a multiple-switch 41 and source of electric current, not shown, whereby either one, or both, of the heater coils 38 may be individually, or jointly, used.

Frictionally fitting each of the spaced apertures 18, of the bearing members 17, is a stationary spacer sleeve 42, in turn affording rotary support for a tubular bushing 43 having a surrounding gear 44 at the inner end, said parts being maintained in vertically aligned relation by apertured collars 45 with set-screws 46 engaged in correspondingly-threaded holes 47, seen to best advantage in Fig. VI, in the ends of the rotary bushings 43 remote from the gears 44, with the collars 45 overlapping the confronting ends of said bushings and the associated outer face of the end walls 5, 6, as clearly apparent from Figs. II or III. It is to be here particularly noted the gear ends 44 of all of the several spaced bushings 43 at each side of the machine intermesh and alignedly rotate in a common vertical plane, while the respective sets of such bushings 43 are operatively coordinated for simultaneous rotation by a cross-shaft 48 freely movable in the respective bearing member sockets 19; said shaft being restrained against lengthwise shifting by fixable collars 49 and having pinions 50 secured thereon in mesh with the opposing uppermost gears 44, as clearly shown in Figs. II and IV more particularly.

Removably engaging in the bore (which may be cylindrical, tapering outwards or of other cross-section) of each journal member 43 is the correspondingly sectioned handle portion 51 of a skewer 52, preferably of rectangular stock having the free end 53 suitably pointed for rotative bearing in the conical aperture of spaced offsets 54 in a channel section frame 55, conveniently and rigidly fixed to the inner surface of the front wall 3; said frame projecting intermediate the confronting inner ends of the several skewers 52. It will, of course, be understood that the sets of handle portions and skewers 51, 52, respectively, confronting each of the refractory slabs 34, are axially aligned and that the conically apertured bearing offsets of the frame 55 are similarly located in order that the entire series of skewers 52 may be horizontally rotated in unison, within a common vertical plane, without any binding or relative displacement. In other words, the two series of skewers 52, shown by way of example, are rotative in axial alignment relative to one another as well as in horizontal spaced parallelism; while it is further remarked that by making the skewers 52 from rectangular or polygonal cross section stock, provision is positively provided that all of the "hot dogs" are uniformly rotated and barbecued.

To operatively coordinate the mechanism above described, use is preferably made of a suitable electric motor 56, supported by the end wall 5, a base confronting convenient reinforcement 57 contacting the inner face of said wall, and clamp bolts 58 coupling said parts rigidly together. The shaft 59 of the motor 56 is conveniently provided with a worm-drive 60 coactive with a suitable gear 61 fast on the end of a short shaft 62, journaled in a bearing bracket 63, and passage of attaching bolts 64 through the flanged ends thereof as well as the orifices 22 of the bearing member 17. The short shaft 62 has fixed to its inner end a gear 65, in mesh with the surrounding gear 44 of the adjacent upper bushing 43 as most clearly shown in Fig. III. By the means thus described, in conjunction with the cross shaft 48, and by providing a speed control switch 66 in the circuit, not shown, of the motor 56, it will be readily appreciated that the machine can be variably operated in accordance with the public demand for "hot dogs."

A suitable drawer 67 is fitted between appropriate guides 68 in the lower part of the cooking chamber 13 and provided with a knob 69, said drawer serving to collect the "drippings," from the cooking wieners or "hot dogs" 14, for removal as and whenever desirable.

From the foregoing the operation of the invention will be self-evident without further explanation; and, while there is disclosed a preferred embodiment, detail changes may be made without departing from the spirit thereof, and it is desired to include herein all such reasonable variations as fairly come within the scope of the following claims.

Having thus described my invention, I claim:

1. In a machine of the type described, the combination of an enclosure separated into roasting and heating divisions, a heater in the roasting division in proximity to the other division, removable rotary members axially sustaining the articles to be roasted in horizontal alignment and vertical spaced relation, means coordinating the rotary members for operation in a common vertical plane, and a drive motor connecting to one of the rotary member coordinating means.

2. A machine for barbecuing wieners and the like comprising an enclosure, a partition across the enclosure setting apart roasting and heating divisions, means supporting a heater in spaced proximity to the partition aforesaid and within the heating division, removable devices for axially sustaining the wieners horizontally and vertically spaced in front of the heater, bearing means coactive with the inner ends of the removable devices to maintain them in horizontal alignment, gear means coordinating the removable devices for operation in a common vertical plane, and a drive motor connecting with one of the gear means for actuation of the entire coordinated gears.

3. A machine for barbecuing wieners and the like comprising an enclosure; said enclosure including a base, front and back walls of sheet metal, hollow side walls incorporating bearing members with surrounding heat insulating material; a partition intermediate the side walls to separate the enclosure into roasting and heating divisions; means supporting a heater coil in front of the partition and within the roasting division; removable skewer devices supported by the respective side wall bearing members for axially sustaining the weiners horizontal and in vertical spaced relation; means operatively connecting the skewer devices together; a bearer frame in the roasting division coactive with the free ends of the skewer devices to maintain them in horizontal alignment; sleeve-like gear means coordinating the skewer devices for concurrent rotation in a common vertical plane; and a drive motor coupled to one of said gear means to effect their collective operation in unison.

4. A machine as defined in claim 3 wherein the partition is of sheet metal with the lower portion outwardly curved below the heating division and the lip thereof is upwardly turned, to respectively function as a chute and arrestor for the articles heated therein.

5. A machine as defined in claim 3, wherein each removable skewer device comprises a hand grasp, a skewer component of rectangular cross section, and said skewer component has the end, remote from the hand grasp, suitably fashioned for piercing purposes as well as for journal support.

6. A machine as defined in claim 3, wherein the skewer device free end coacting frame is of channel section formation, and opposing conically apertured offsets in said section paralleling flanges for rotative reception of the skewer free ends.

7. A machine as defined in claim 3, wherein the sleeve-like gear means each embodies a tubular bushing with peripherally surrounding teeth at one end, said bushing being rotatively held in place by an apertured collar, set screws pass through circumferentially spaced holes in the collar and engage correspondingly threaded holes in the confronting end of said sleeve, and a stationary spacer sleeve intervenes said collar and the surrounding gear inner face for vertical aligning purposes.

8. A machine as defined in claim 3, wherein the skewer devices are operatively connected across the machine by a freely rotative shaft supported at the ends by recesses in the respective side wall bearing members, collars on said shaft prevent lengthwise shifting, and pinions fixed on the shaft mesh with upper opposing sleeve-like gears of the skewer operating means.

WILLIAM T. NARDIN.